Patented Jan. 15, 1952

2,582,732

UNITED STATES PATENT OFFICE 2,582,732

METHOD OF VULCANIZING RUBBER AND PRODUCT THEREOF

Richard O. Zerbe, Nitro, W. Va., assignor to Monsanto Chemical Company, St. Louis, Mo., a corporation of Delaware No Drawing. Application January 17, 1949, Serial No. 71,400

16 Claims. (Cl. 260—795)

This invention relates to the vulcanization of rubber. More particularly it relates to the vulcanization of rubber with a new class of accelerators and to the vulcanized products resulting thereby.

In the compounding of rubber, both natural and synthetic, improvements have been constantly sought, particularly in respect to the more efficient and more economical use of vulcanization accelerators. While many accelerators, per se, produce vulcanizates having acceptable physical properties, it has long been known that by the incorporation into the compounded stock of accelerators such as dibutyl ammonium oleate and diphenyl guanidine phthalate in addition to other type accelerators, such as the thiazoles, greater ease in processing and a better vulcanizate is obtained. It has become customary to denote materials such as dibutyl ammonium oleate and diphenyl guanidine phthalate and the like as activators. Similarly it is preferred to employ the new accelerators in conjunction with accelerators of other types as activators.

It is an object of this invention to provide a class of activators which are capable of assisting accelerators possessing inherent weaknesses, such as inefficient vulcanizing effect, limited solubility, and poor dispersibility in rubber stocks, thus causing uneven cures which in turn result in non-uniform properties and erratic performance in service. It is also an object of this invention to decrease the time of vulcanization. A further object is to provide a wider choice of curing conditions such that a series of combinations varying in scorch and curing properties may be obtained. For example, the ratio of activator to accelerator may vary depending upon the type of rubber, type of stock, temperature of cure, time of cure, the particular accelerator, and the objective of the compounder, i. e., whether a low or high modulus is desired or a short or long cure is required. Other objects will appear hereinafter.

It has been found in accordance with this invention that the above mentioned objects are attained by vulcanizing a vulcanizable rubber stock in which has been incorporated a member of the group of compounds comprising amic acids, or half amides of dicarboxylic acids, and their salts of the following general formula

where M is hydrogen or a salt forming group such as a metal, ammonia, an amine, urea, and the like; where $R_1$ and $R_2$ are alkyl, cycloalkyl, and aralkyl groups such as methyl, ethyl, ethanol, propyl, butyl, amyl, cyclohexyl, methyl cyclohexyl, benzyl, phenethyl, and their various isomeric groups, carbamyl and hydrocarbon substituted carbamyl radicals, thiocarbamyl and hydrocarbon substituted thiocarbamyl radicals, and the like, and where either or both $R_1$ or $R_2$ may be hydrogen; where R is an ethylene or propylene group or substituted homologue or analogue thereof. Among the salt forming groups are the alkali and alkaline earth metals, zinc, magnesium, and the like, ammonia, methyl amine, ethyl amine, ethanol amine, 2-cyanoethyl amine, isopropyl amine, amyl amine, butyl amine, 2-cyanobutyl amine, cyclohexylamine, benzyl amine, diethyl amine, diethanol amine, di-(2-cyanoethyl)-amine, di-isopropyl amine, dibutyl amine, methyl propyl amine, dicyclohexyl amine, dibenzyl amine, piperidine, trimethyl amine, triethyl amine, and the like.

Although amic acids and their salts of the above described general formula produce good results, the best results are obtained with succinamic acid, its metal salts, and its alkyl and cycloalkyl amine salts, wherein at least one hydrogen atom of the amido nitrogen is replaced by an alkyl or cycloalkyl group. As specific examples of this group are succinamic acid, N-isopropyl succinamic acid, N-butyl succinamic acid, N-cyclohexyl succinamic acid, N,N-dicyclohexyl succinamic acid, ethyl amine salt of N-ethyl succinamic acid, butyl amine salt of N-butyl succinamic acid, di-isopropylamine salt of N,N-di-isopropyl succinamic acid, dicyclohexyl amine salt of N,N-dicyclohexyl succinamic acid, zinc salt of N-butyl succinamic acid, zinc salt of N-cyclohexyl succinamic acid, and the zinc salt of N,N-dicyclohexyl succinamic acid.

As illustrative of the preparation of the new activators are the following examples but in nowise are they to be considered as limitative thereof.

Example 1

40 parts by weight (substantially 0.4 mols) of succinimide was added to 200 cc. of water in a suitable reaction vessel and immersed in a steam bath. To the aqueous solution was added 62 parts by weight (substantially 0.2 mols) of barium hydroxide octahydrate and the white salt of barium succinamate filtered off. The salt was then dissolved in sulfuric acid and the barium sulfate salt filtered off. The filtrate was evaporated to dryness, the residue taken up with acetone and the impurities filtered off. Upon removal of the solvent, 25.2 parts by weight of a white powder, believed to be succinamic acid, was obtained having a melting point of 156°–157° C.

Example 2

25 parts by weight (substantially 0.25 mols) of succinic anhydride was placed in a suitable container and at a temperature not exceeding 15° C. and thereto 90.7 parts by weight of dicyclohexyl amine (substantially 0.54 mols) was added slowly with constant agitation. Upon completion of the amine addition the temperature was allowed to rise to 120° C. On cooling the mix a dark purplish-gray-black solid believed to be the dicyclohexyl amine salt of N,N-dicyclohexyl succinamic acid developed which possessed a melting point range of 117°–125° C.

Example 3

25 parts by weight (substantially 0.25 mols) of succinic anhydride was placed in a suitable container and thereto at a temperature below 25° C. was added 36.6 parts by weight (substantially 0.5 mols) of butyl amine, over a period of 20 minutes with constant agitation. Upon completion of the amine addition the temperature was allowed to rise and a clear yellow liquid developed. Upon cooling 61.5 parts by weight of a clear yellow liquid, believed to be the butyl amine salt of N-butyl succinamic acid, was isolated.

As exemplary of the activating properties of the amic acids, the following gum stocks were compounded:

| Stock | A | B | C | D | E | F |
|---|---|---|---|---|---|---|
| Smoked sheets rubber____parts by weight__ | 100 | 100 | 100 | 100 | 100 | 100 |
| Zinc oxide_____do____ | 35 | 35 | 35 | 35 | 35 | 35 |
| Sulfur_____do____ | 1.3 | 1.3 | 1.3 | 1.3 | 1.3 | 1.3 |
| Stearic acid_____do____ | 1.0 | 1.0 | 1.0 | 1.0 | 1.0 | 1.0 |
| Benzothiazyl disulfide_____do____ | 0.6 | 0.6 | 0.6 | 0.6 | 0.6 | 0.6 |
| Succinamic acid_____do____ | 1.0 | | | | | |
| Dicyclohexylamine salt of N,N-dicyclohexyl succinamic acid____parts by weight | | 1.0 | 0.5 | | | |
| Butylamine salt of N-butyl succinamic acid____parts by weight | | | | 1.0 | 0.5 | |

The above stocks so compounded were vulcanized in the usual manner by heating in a press for different periods of time at 142° C. The physical properties of the respective cured rubber stocks are set forth below:

Table I

| Stock | Min. Cure at 142° C. | A | B | C | D | E | F |
|---|---|---|---|---|---|---|---|
| 300% modulus, lbs./in.² | 10 | 60 | 60 | 80 | 160 | 80 | no cure. |
| | 20 | 125 | 170 | 175 | 178 | 150 | Do. |
| | 40 | 140 | 163 | 165 | 167 | 147 | Do. |
| 500% modulus, lbs./in.² | 10 | 183 | 283 | 433 | 750 | 625 | Do. |
| | 20 | 623 | 820 | 788 | 878 | 870 | Do. |
| | 40 | 640 | 735 | 798 | 800 | 780 | 260. |
| 700% modulus, lbs./in.² | 10 | 820 | 1,268 | 1,490 | 2,968 | 2,230 | no cure. |
| | 20 | 2,168 | 3,055 | 2,718 | 3,220 | 2,903 | Do. |
| | 40 | 2,338 | 2,703 | 2,625 | 3,095 | 2,743 | 1,067. |
| Ultimate tensile strength, lbs./in.² | 10 | 1,178 | 2,265 | 2,043 | 4,030 | 2,455 | no cure. |
| | 20 | 2,255 | 4,100 | 3,135 | 4,125 | 3,255 | Do. |
| | 40 | 3,280 | 3,940 | 2,888 | 4,103 | 3,340 | 1,810. |
| Ultimate elongation, % | 10 | 758 | 840 | 793 | 795 | 738 | no cure. |
| | 20 | 718 | 778 | 755 | 773 | 753 | Do. |
| | 40 | 780 | 785 | 740 | 770 | 753 | 810. |

It is obvious from the above data the amic acids and their salts are a class of compounds which exert a marked activating effect on the cure rate and produce vulcanizates of high tensile strength in a short time. The new activators are readily compatible in rubber stocks, both natural and synthetic, and are non toxic. The amic acids also exhibit a marked activating effect on the cure rate of synthetic rubber such as GR–S.

As exemplary of the activatable organic accelerators or primary accelerators are the mercapto thiazoles, the mercapto arylene thiazoles, the thiuram mono and disulfides, the dithiocarbamates, the xanthates, and other "ultra" and "semi-ultra" vulcanization accelerators.

Smaller amounts of the amic acid activators may be employed than those indicated in the specific examples. It has been found that as little as 0.2% on the rubber of amic acid is effective. Amounts higher than those specifically shown, as for example 2%, can be employed depending upon the conditions of compounding and the objectives of the compounder.

The amic acids and their salts of themselves possess vulcanization accelerator properties. For example the following natural gum rubber stocks were compounded comprising

| Stock | G | H |
|---|---|---|
| Smoked sheets rubber_____parts by weight__ | 100 | 100 |
| Zinc oxide_____do____ | 5 | 5 |
| Sulfur_____do____ | 3 | 3 |
| Stearic acid_____do____ | 1 | 1 |
| Butylamine salt of N-butyl succinamic acid___do____ | 1.5 | |
| Dicyclohexyl amine salt of N,N-dicyclo-hexyl succinamic acid_____parts by weight__ | | 1.5 |

The above stocks so compounded were vulcanized in the usual manner by heating in a press for 60 and 90 minutes respectively at 142° C.

The following results were obtained on testing the cured rubber products:

Table II

| Stock | Minutes cure at 142° C | Modulus of Elasticity in lbs./in.² at elongations of— | | Ultimate Tensile, lbs./in.² | Ult. Elong., Per Cent |
|---|---|---|---|---|---|
| | | 500% | 700% | | |
| G | 60 | 360 | 1,603 | 2,197 | 770 |
| G | 90 | 518 | 1,943 | 2,658 | 790 |
| H | 60 | 335 | 1,420 | 2,453 | 788 |
| H | 90 | 530 | 2,045 | 2,825 | 773 |

By the term "rubber" as employed in the appended claims is meant natural as well as synthetic rubbers which are capable of vulcanization when heated with sulfur and includes latices and reclaims of such materials whether or not admixed with pigments, fillers, softeners, antioxidants, etc.

While specific embodiments of the invention have been described herein, it will be understood that the invention is not so limited but that various modifications may be made therein without departing from the spirit of the invention or from the scope of the appended claims.

What is claimed is:

1. The method of vulcanizing a rubber which comprises heating a rubber and sulfur in the presence of a small amount of a compound selected from the group consisting of acids of the structure

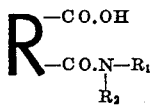

and salts thereof where R is an alkylene group containing more than one but less than four carbon atoms and where $R_1$ and $R_2$ are selected from the group consisting of hydrogen, alkyl radicals of one to five carbon atoms inclusive and their monohydroxy and monocyano substituted derivatives, benzyl, phenethyl, cyclohexyl and methylcyclohexyl radicals.

2. The method of vulcanizing rubber which comprises heating rubber and sulfur in the presence of 0.2% to 2% based on the weight of the rubber of a succinamic acid wherein at least one hydrogen atom of the amido nitrogen is replaced by an aliphatic hydrocarbon radical containing one to seven carbon atoms inclusive.

3. The method of vulcanizing rubber which comprises heating rubber and sulfur in the presence of 0.2% to 2% based on the weight of the rubber of an amine salt of a succinamic acid wherein at least one hydrogen atom of the amido nitrogen is replaced by an aliphatic hydrocarbon radical containing one to seven carbon atoms inclusive.

4. The method of vulcanizing rubber which comprises heating rubber and sulfur in the presence of a thiazole accelerator and 0.2% to 2% based on the weight of the rubber of a succinamic acid wherein at least one hydrogen atom of the amido nitrogen is replaced by an aliphatic hydrocarbon radical containing one to seven carbon atoms inclusive.

5. The method of vulcanizing rubber which comprises heating rubber and sulfur in the presence of a thiazole accelerator and 0.2% to 2% based on the weight of the rubber of an amine salt of a succinamic acid wherein at least one hydrogen atom of the amido nitrogen is replaced by an aliphatic hydrocarbon radical containing one to seven carbon atoms inclusive.

6. The method of vulcanizing rubber which comprises heating rubber and sulfur in the presence of 0.2% to 2% based upon the weight of the rubber of the butyl amine salt of N-butyl succinamic acid.

7. The method of vulcanizing rubber which comprises heating rubber and sulfur in the presence of 0.2% to 2% based upon the weight of the rubber of the dicyclohexyl amine salt of N,N-dicyclohexyl succinamic acid.

8. The method of vulcanizing rubber which comprises heating rubber and sulfur in the presence of 0.2% to 2% based upon the weight of the rubber of succinamic acid and a thiazole accelerator.

9. The vulcanized rubber product obtained by heating a rubber and sulfur in the presence of a small amount of a compound selected from the group consisting of acids of the structure

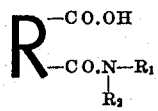

and salts thereof where R is an alkylene group containing more than one but less than four carbon atoms and where $R_1$ and $R_2$ are selected from the group consisting of hydrogen, alkyl radicals of one to five carbon atoms inclusive and their monohydroxy and monocyano substituted derivatives, benzyl, phenethyl, cyclohexyl and methylcyclohexyl radicals.

10. The vulcanized rubber product obtained by heating rubber and sulfur in the presence of 0.2% to 2% based on the weight of the rubber of a succinamic acid wherein at least one hydrogen atom of the amido nitrogen is replaced by an aliphatic hydrocarbon radical containing one to seven carbon atoms inclusive.

11. The vulcanized rubber product obtained by heating rubber and sulfur in the presence of 0.2% to 2% based on the weight of the rubber of an amine salt of a succinamic acid wherein at least one hydrogen atom of the amido nitrogen is replaced by an aliphatic hydrocarbon radical containing one to seven carbon atoms inclusive.

12. The vulcanized rubber product obtained by heating rubber and sulfur in the presence of a thiazole accelerator and 0.2% to 2% based on the weight of the rubber of a succinamic acid wherein at least one hydrogen atom of the amido nitrogen is replaced by an aliphatic hydrocarbon radical containing one to seven carbon atoms inclusive.

13. The vulcanized rubber product obtained by heating rubber and sulfur in the presence of a thiazole accelerator and 0.2% to 2% based on the weight of the rubber of an amine salt of a succinamic acid wherein at least one hydrogen atom of the amido nitrogen is replaced by an aliphatic hydrocarbon radical containing one to seven carbon atoms inclusive.

14. The vulcanized rubber product obtained by heating rubber and sulfur in the presence of 0.2% to 2% based upon the weight of the rubber of the butyl amine salt of N-butyl succinamic acid.

15. The vulcanized rubber product obtained by heating rubber and sulfur in the presence of 0.2% to 2% based upon the weight of the rubber of the dicyclohexyl amine salt of N,N-dicyclohexyl succinamic acid.

16. The vulcanized rubber product obtained by heating rubber and sulfur in the presence of 0.2% to 2% based upon the weight of the rubber of succinamic acid and a thiazole accelerator.

RICHARD O. ZERBE.

REFERENCES CITED

The following references are of record in the file of this patent:

UNITED STATES PATENTS

| Number | Name | Date |
|---|---|---|
| 2,011,219 | Harman | Aug. 13, 1935 |
| 2,013,117 | Tuley | Sept. 3, 1935 |
| 2,034,889 | Williams | Mar. 24, 1936 |
| 2,131,127 | Horst | Sept. 27, 1938 |

FOREIGN PATENTS

| Number | Country | Date |
|---|---|---|
| 394,754 | Great Britain | July 6, 1933 |